(12) United States Patent
Stauffer (10) Patent No.: US 11,761,426 B1
(45) Date of Patent: Sep. 19, 2023

(54) WINDMILL HYDROELECTRICITY GENERATOR

(71) Applicant: David William Stauffer, Portland, OR (US)

(72) Inventor: David William Stauffer, Portland, OR (US)

( * ) Notice: Subject to any disclaimer, the term of this patent is extended or adjusted under 35 U.S.C. 154(b) by 0 days.

(21) Appl. No.: 17/870,670

(22) Filed: Jul. 21, 2022

(51) Int. Cl.
| | |
|---|---|
| *F03D 9/14* | (2016.01) |
| *F03D 13/20* | (2016.01) |
| *F03B 13/06* | (2006.01) |
| *F03D 9/28* | (2016.01) |

(52) U.S. Cl.
CPC ............... *F03D 9/14* (2016.05); *F03B 13/06* (2013.01); *F03D 9/28* (2016.05); *F03D 13/20* (2016.05)

(58) Field of Classification Search
CPC ... F03D 9/14; F03D 9/28; F03D 13/20; F03B 13/06
See application file for complete search history.

(56) References Cited

U.S. PATENT DOCUMENTS

| | | | | |
|---|---|---|---|---|
| 228,524 | A * | 6/1880 | Fulton ....................... | F03D 9/28 417/35 |
| 3,525,290 | A * | 8/1970 | Pelsue ..................... | E04H 15/04 135/900 |
| 4,165,468 | A * | 8/1979 | Fry ......................... | F03D 13/20 290/55 |
| 2011/0133466 | A1 * | 6/2011 | Kamenov ............... | F03D 15/10 290/55 |
| 2016/0298934 | A1 * | 10/2016 | Mora Gamez ............ | F41H 3/02 |

* cited by examiner

*Primary Examiner* — Sean Gugger (57) ABSTRACT

A zero-fossil-fuel-using non-polluting apparatus to (1) use wind power to (2) generate a steady flow of hydroelectricity (3) from increasing the height level of water from a water table or river or lake and (4) storing that water and its potential energy in (5) a water tower, and then (6) releasing that water's potential energy in a (7) steady gravity-driven flow in a downward-flowing pipeline to (8) operate in-pipe electricity generators to establish a reliable non-fluctuating source of hydroelectricity from (9) many in-pipe hydroelectricity generators in pipelines to create electricity when the water tower water is released to the in-pipe hydroelectricity generators which creates (10) a steady non-fluctuating stream of water to turn the turbines of many in-pipe hydroelectric generators to create (11) a steady, non-fluctuating flow of electricity regardless of whether the wind is blowing or the sun is shining.

3 Claims, 7 Drawing Sheets

WINDMILL HYDROELECTRICITY GENERATOR

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

The invention requires a source of water that may exist as a natural resource or that may be piped-in with another invention of David William Stauffer, as it is described in U.S. patent application Ser. No. 13/734,978 (filed Jan. 6, 2013). In the alternative, the gravity flow of water to the Hydro Electricity Generators may be created by windmill pumping of water to a higher level or, when there is insufficient wind, by an auxiliary electric pump powered by in-pipe hydroelectricity generators using the pipeline water flow from the water that had been pumped up to a higher-level water storage tower in this invention.

BACKGROUND OF THE INVENTION

(1) Fields of the Invention

Wind powered electricity generation.
Wind powered pumping of water to a height higher than the source water.
Windmill-driven pumping of water in a pipeline to a higher water tower.
In-pipe hydroelectricity generation from the downward water pressure force of gravity in a pipeline.
Rural forest wildfire suppression.

(2) Description of Related Art Including Information Disclosed Under 37 CFR 1.97 and 1.98

Inventor Stauffer will hereafter list eight structural descriptions of his novel elements which, individually, and in his novel combination of all of them, entitle Inventor Stauffer to be granted the patent pursuant to 35 U.S.C. 101.
The Application of Lee" case states:
"Patent claims may be sustained in a proper case because of the fact of combination rather than the novelty of any particular element." Application of Lee, Cust & Pat App. 1951, 193 F.2d 186, 39C.C.P.A. 752, 92 US.PQ. 131.

Inventor Stauffer lists eight descriptions of his elements which, individually, and in his novel combination of all of them, entitle Inventor Stauffer to be granted the patent pursuant to 35 U.S.C. 101.

"[An] Invention or discovery is new or possesses the requisite element of novelty, so that there is a patentable invention if the invention or discovery involves the presence of some element, or new position of an old element in combination different from anything found in the prior structure." *Mott Corp. v Sunflower Industries, Inc. C.A.* 10 (Kan.) 1963, 314 F.2d872, 137 US.P.Q. 288. (bold added).

"Patent claims may be sustained in a proper case because of the fact of combination rather than the novelty of any particular element." Application of Lee, Cust & Pat App. 1951, 193 F.2d 186, 39C.C.P.A. 752, 92 US.P.Q. 131.

There are 8 elements of the invention which are not obvious, and which are novel enough, either alone or in Inventor Stauffer's new combination, to be patentable, i.e., to deserve a patent grant. Inventor Stauffer has eight novel patentable elements, which is many more than the one novel element in an old combination of elements that will justify the award of a patent to Inventor Stauffer.

The instant invention solves one of America' most important environmental problems: present wind turbines produce intermittent electricity when utility companies need reliable continuous electricity. The instant invention turns intermittent electricity into reliable continuous electricity that a utility can hook up and then be assured of the continued production of a specific level of power for the foreseeable future. At present, there is not enough wind to directly generate electricity on a 24-hour continuous basis. The problem is similar to old-time sailing ships when they were "becalmed", i.e., there was not enough wind to push their sails to allow them to travel over the oceans, so the ships and sailors would sit motionless—sometimes for days—on the ocean until new winds came to push them.

The many tall wind turbines, with 40-ft. blades, that presently exist, get enough wind to turn only about forty percent of the time. The other sixty percent of the time, they are sitting motionless—and do not produce any electricity. The intermittent nature of their electricity makes them unattractive to utility companies which need a steady supply of electricity for their companies. With regard to intermittent wind energy, utility companies do not want to distribute wind-power generated electricity to their customers when the wind is blowing, but then have to switch all those customers back to fossil-fuel-burning sources when the wind quits blowing—and that switching may need to happen 5 or 6 times per day. The utility companies do not want to have the "feast and famine" supply, so they do not sign up for the wind powered electricity—which frustrates one of President Biden's goals of converting to clean energy—wind energy—in the near future.

The instant invention solves this "intermittent" problem by changing from a wind turbine's direct turning of the turbines of an electricity generator to using the windmill turbines to pump "more-than-enough" water up to a water holding tank so that the pumped water can then be drained from the water holding tank in a steady stream of water that can then cause a steady turning of the turbines of electricity generator(s) to create a steady—not intermittent—source of electricity for the utility company's customers. The instant invention inserts a steadying influence on the wind power by causing the wind-powered pumping of water up to a water holding tank and then releasing that water to the turbines of electricity generators in a steady flow that creates a steady supply of electricity—even when the wind does not blow.

A second problem with the 40-ft wind turbine blades is that that they kill many birds that fly into the blades. The instant invention shortens the blades from about 40 feet to around four feet—like the old-time windmill pumps that would pump water up from an underground water table so that a rancher's herds could drink water from a water tank, or a farmer's fields could be irrigated with the pumped water. In addition, with the shorter blades, the invention can have a wire/plastic cover around the blades so that birds and animals do not carelessly fly into the blades and are killed or become injured.

Rather than a platform structure to support the windmill hydroelectricity generators, those windmill hydroelectricity generators will be suspended from at least two intersecting arches. The smaller windmills will be able to produce as much electricity as the 40-ft. blades because each set of large intersecting arches will be able to support many smaller windmills in the area underneath the intersecting arches.

Another present-day political problem is that viewers of the horizon where 40-ft. wingspan windmill blades are located say that the horizon view of the hills, mountains, and ridges where the windmills are, or will be, located is spoiled by the windmills. The present invention will solve that problem by covering the smaller windmills with green and black, or tan and black, camouflage so that the present invention's smaller windmills will blend in with their environment and the view of the horizon will not be significantly altered so that environmentalists will not have objections.

The covers will be covered in green and black, or brown and black, camouflaging, so that they will better fit into the environment while letting the wind freely blow into the blades of the wind turbines to raise the water from the lower level up to the water holding tank-so that the water can be steadily-released to provide continuous electricity 24 hours per day.

Another significant present-day political problem that must be solved in any environmental improvement plan is that owners of riparian rights will resist the removal of y water from a water table or river or lake. The present invention solves that problem by putting back all water that it lifts from a water table or river or lake back into the water table or river or lake from which it came. The present invention does not deprive any water table, or lake, or river, of even one drop of water; hence there should be no objection by riparian rights owners.

This invention is not a solution for drought conditions or lack of rain or lack of irrigation water. Any advocate of these environmental inventions will do a great disservice to the environmental approval of these inventions by proposing to divert water from a river, or lake or underground water table to alleviate drought conditions or irrigate dry land or crops. The approval of such diversions of water will necessitate years of debates in local, state and national governments and regulatory agencies, and will probably result in the defeat of the proposal to install these inventions. Therefore, these inventions specifically do not include any diversion of water. Inevitably, farmers who need irrigation water and those living in drought conditions will desire that some of that water that is stored in the (c) water holding tank be diverted to their farmlands or to counteract drought conditions. The inventor will avoid all that diversion controversy by making the invention so that not one drop of water is diverted from any water source.

There will be no diversion of water—EXCEPT WHEN A LIFE-THREATENING WILDFIRE is present near the (c) water holding tank. In that case it would be inhuman to prevent the water in the (c) water holding tank from being used to extinguish life-endangering wildfires. On those very rare occasions that the water in the (c) water holding tank is used to save lives, most people will not object to the diversion of water for that rare purpose. So, on those rare occasions that wildfires must be extinguished, it is contemplated that the inventions will be used to fight fires and save lives. For the majority of time, however, there will be no diversion of water from any water source. It should be noted that another invention of David William Stauffer, as it is described in U.S. patent application Ser. No. 13/734,978 (filed Jan. 6, 2013), is capable of supplying water for the farmer's crops and for fighting wildfires—also without diverting any water from the river or lake or reservoir or other water table.

The present invention has the following notable novel elements that are differences from the "SYSTEM AND METHOD FOR CONTROLLING WATER FLOW BETWEEN MULTIPLE RESERVOIRS OF A RENEWABLE WATER AND ENERGY SYSTEM" of Miller, U.S. Pat. No. 7,866,919 (Jan. 11, 2011):

1. The present invention will not remove one drop of water from the water table or river or lake or stream because it will raise the water by using traditional windmill mechanics, and then it will return all the water to the same water source from which it was taken. There will be no loss of water from the water source so there will be no objection to the invention by riparian rights owners or environmentalists who are downstream from the present invention's windmill generators.
2. Unlike the Miller invention, there will be no loss of water due to evaporation because the windmills will raise the water from the water source by means of an enclosed air-tight and water-tight pipeline, and store that water in an air-tight water-tight enclosed holding tank, and then let the water drop back to the body of water from which it came by means of another air-tight, water-tight pipeline that will also allow the water to flow past, and turn the turbines of, in-pipe hydroelectricity generators. No water table or lake or river will lose one drop of water to the invention.
3. Unlike the present-day 40-ft wingspan wind generators, flying birds will not be killed or injured by the whirling windmill blades because the present invention's shorter windmill blades will be able to be covered by a wire/plastic mesh covering that will let wind in to turn the blades, but will prevent birds from flying into, and being killed or injured by, the windmills' blades.
4. In addition, the coverings over the much smaller windmills will be colored in green and black, or brown and black, camouflage so that, from a distance, the instant invention will blend into its environmental surroundings. 5. Miller's invention partially depends on powered pumps to lift water from lower reservoirs (or water sources) to his upper reservoirs; in contrast, the novel instant invention will use non-polluting wind power to perform the raising of the water so that there is no burning of fossil fuels and no carbon dioxide air pollution that results from the burning of fossil fuels.
6. The smaller windmill blades of the present invention are a known technology that does not put as much stress, and therefore, heat, on the smaller turning shaft and blades as does the 40-ft wind blades, so the windmills will have a longer lifespan and will be more easily maintained and/or replaced by mechanics who are closer to the ground when performing repairs.

7. The present invention will use wind power to pump water up to the elevated (c) water holding tank so that each unit has excess water in the elevated holding tank to continue an uninterrupted flow of water past the in-pipe electricity generators—even when there is no wind—to provide a steady flow of electricity to utility companies. The present invention, however, will also have an auxiliary standby pump that may be powered by electricity stored in a battery, or an auxiliary power source, to pump water when, on extremely rare occasions, there is not enough wind for such an extended period that the elevated holding tanks run low on water for the in-pipe electricity generators. Then, the auxiliary pumps will keep the (c) water holding tank filled and ensure that the steady supply of electricity to the utility companies is uninterrupted and continuous.

8. In contrast to the pedestal structure of the present-day wind turbines with their 40 ft. wingspan, the present invention's windmills will be suspended from large intersecting arches which will provide more stability in times of earthquakes and will also allow many more windmills per structure than the one-propellor turbines of the present-day 40-ft. wingspan wind-powered electricity generators that can fall from their foundations during an earthquake.

BRIEF SUMMARY OF THE INVENTION

I. A zero-fossil-fuel-using non-polluting apparatus to (1) use wind power to (2) generate a steady flow of hydroelectricity (3) from increasing the height level of water from a water table or river or lake or reservoir and (4) storing that water and its potential energy in (5) a water tower, and then (6) releasing that water's potential energy in a (7) steady gravity-driven flow in a downward-flowing pipeline to (8) operate in-pipe electricity generators to establish a reliable non-fluctuating source of hydroelectricity (10) without depleting the water in the water table from which the invention derives its water so that the invention is a zero-fossil-fuel-using, almost free, non-polluting apparatus structure to elevate water from a lower water table to fill, with water, a water storage tower without using any pumps except in times when there is no wind and the level of stored water in the water tower is insufficient to turn the turbines of the hydroelectric in-pipe electricity generator in a steady flow so, in that rare occurrence, the apparatus structure will use the electricity created by the structure, or a battery that has been charged by the structure, to (11) empower an auxiliary pump to continue to raise water up from the water table to fill the water tower to create the potential energy in the water in the water tower to empower (12) many in-pipe hydroelectricity generators in pipelines to create electricity when the water tower water is released to the in-pipe hydroelectricity generators which creates (13) a steady non-fluctuating stream of water to turn the turbines of many in-pipe hydroelectric generators to create (14) a steady, non-fluctuating flow of electricity regardless of whether the wind is blowing or the sun is shining, and (15) the holding tank water will be released to go back to the same water table from which the water was originally derived so that (16) the invention does not deprive the water table of any water, and addressing environmental concerns, (17) the entire structure will be covered by either a green and black camouflage-colored mesh screen that allows wind to go through the screen but prevents birds and other animals from making contact with the blades of the windmill in areas of green vegetation and forests, and a "tan and black camouflage-colored mesh screen" in areas of dirt or rock-landscapes so that the structure blends into its environment and each windmill unit will be covered by a camouflage-colored mesh screen to make the entire structure look, from a distance, like a big green or tan mountain and (18) such green or tan-colored mesh screen and the hydroelectricity apparatus will be suspended from two or more arches that intersect at the top to (19) support the weight of the structure and (20) provide stability during earthquakes.

(a) It is common knowledge that elevated windmills can be turned by the force of pollution-free, no fossil-fuel-using winds to pump water up from a lower water table or river or lake or reservoir so that water is elevated to a tank or reservoir with potential energy where the water, with its potential energy will later be released in a steady flow to a pipeline to turn the turbines of in-pipe hydroelectricity generators to create no-fossil-fuel-burning pollution-free hydroelectricity.

(b) The water in (a), above, that is pumped higher by the windmill is the same water which is released to flow back to the same water table or body of water from which the water came. There will be no loss of water to the water table or body of water that supplies the water for the invention so environmentalists, riparian rights owners, and regulatory bodies cannot complain about any loss of water to the environment. The invention will decrease emissions of carbon dioxide into the air because the invention will use wind power to replace the burning of fossil fuels, as an energy source, to raise up water to turn the turbines of electricity generators. The invention uses wind power to pump water up from a water table or lake or river or reservoir and store that water in a higher, elevated water tower storage container so that that water, by the force of gravity, will later be released to turn the turbines of electricity generators and then return the released water to the same table or lake or river or body of water from which it was originally taken so that there is no net decrease in the water level of the water table or lake or river or reservoir. The invention uses the potential energy of a stored body of water to allow a pipeline of water to flow by gravity to turn the turbines of electricity generators-all without burning fossil fuels to pump water or to power electricity generators.

The invention provides a zero-fossil-fuel-using, almost free, non-polluting apparatus to produce electricity to:
(i) provide immediate electricity, and
(ii) to charge a battery that can turn the in-pipe hydroelectricity generators to provide electricity during times when there is insufficient wind to turn the windmill blades, as well as insufficient water in the elevated stored body of water to continue to turn the turbines of the in-pipe hydroelectricity generators, and
(iii) during times when there is insufficient wind to turn the windmill turbines, as well as insufficient water in the elevated stored body of water to continue to turn the turbines of the in-pipe electricity generators, the invention uses the charged batteries to pump water up from the lower water table or lake or river or reservoir to the elevated storage container to continue the filling of the elevated water container to ensure the continuous undiminished even flow of electricity from released water flowing to keep producing a steady flow of hydroelectricity from the in-pipe electricity generators.

All of the above pollution-free hydroelectricity generation will be accomplished without the air pollution caused by burning fossil fuels by using the forces of wind and gravity to create the steady flow of pollution-free hydroelectricity generation.

This patent application uses commonly accepted and known scientific knowledge which is so well known that it is not necessary to cite the prior art of patent cases. To this common knowledge, Inventor Stauffer has added new elements and a novel combination of all the elements.

There are patents on some of the elements of the present invention, but there is no patent that claims an apparatus that includes all of the elements of the present patent application, and no prior art that arranges all the claimed elements in the manner that is claimed in the present invention. No other inventor has previously claimed all the elements of Inventor Stauffer's novel invention, which produces hydroelectricity with free wind power-all without the pollution from burning fossil fuels which threatens the earth's environment. Also, this invention does not deprive any body of water of even one drop of water. This invention, when universally implemented, will decrease America's total energy consumption of fossil fuels while producing a reliable steady electricity supply.

Various embodiments of the present disclosures are set forth in the attached figures and in the detailed description of the invention provided herein. It should be understood, however, that this Summary of the Invention may not contain all the aspects and alternative embodiments of the present disclosure, which is not meant to be limiting or restrictive in any manner, and that the invention as disclosed herein is and will be understood by those of ordinary skill in the art to encompass obvious equivalents, improvements, and modifications thereto.

Additional advantages of the present invention will become readily apparent from the following discussion, particularly when taken together with the accompanying drawings.

BRIEF DESCRIPTION OF THE SEVERAL VIEWS OF THE DRAWINGS

FIG. 2: First View of the Water Pumping Apparatus.

FIG. 3: Second View of the Water Pumping Apparatus.

FIG. 4 shows the invention in the form of a single windmill on top of a stick-built platform.

As opposed to the FIG. 4 Standing structure support of the windmill(s), FIG. 5 shows an intersecting arch support structure from which multiple (2 to 30) windmills are suspended and the entire arch support structure is covered with green and black, or brown and black, camouflage wire/plastic mesh coverings so that the entire structure has an environmentally-friendly appearance of a forest on a mountain or hill, and so that wind can blow through the wire/plastic mesh to turn the windmills, but birds and animals will be stopped by the wire mesh so that the birds and animals are not killed by the moving windmill blades.

As opposed to FIG. 5, FIG. 6 shows an intersecting arch support structure from which multiple windmills are suspended and each windmill is covered with green and black, or brown and black, camouflage wire/plastic mesh coverings so that the entire structure has an environmentally-friendly appearance of leaf clusters on tree trunks, and so that wind can blow through the wire mesh to turn the windmills, but birds and animals will be stopped by the wire mesh so that the birds and animals are not killed by the moving windmill blades.

FIG. 7 shows an intersecting arch support structure from which multiple Windmills are suspended and each windmill is individually covered by a Colored Wire/Mesh Cover with green and black, or brown and black camouflage wire/plastic mesh coverings so that each windmill has an environmentally-friendly appearance of a forest on a mountain or hill, and so that wind can blow through the wire/plastic mesh to turn the windmills, but birds and animals will be stopped by the wire/plastic mesh so that the birds and animals are not killed by the moving windmill blades.

(a) DETAILED DESCRIPTION OF THE IN-PIPE POLLUTION-FREE NO-FOSSIL-FUEL-USING HYDROELECTRICITY GENERATOR

Figure 1:
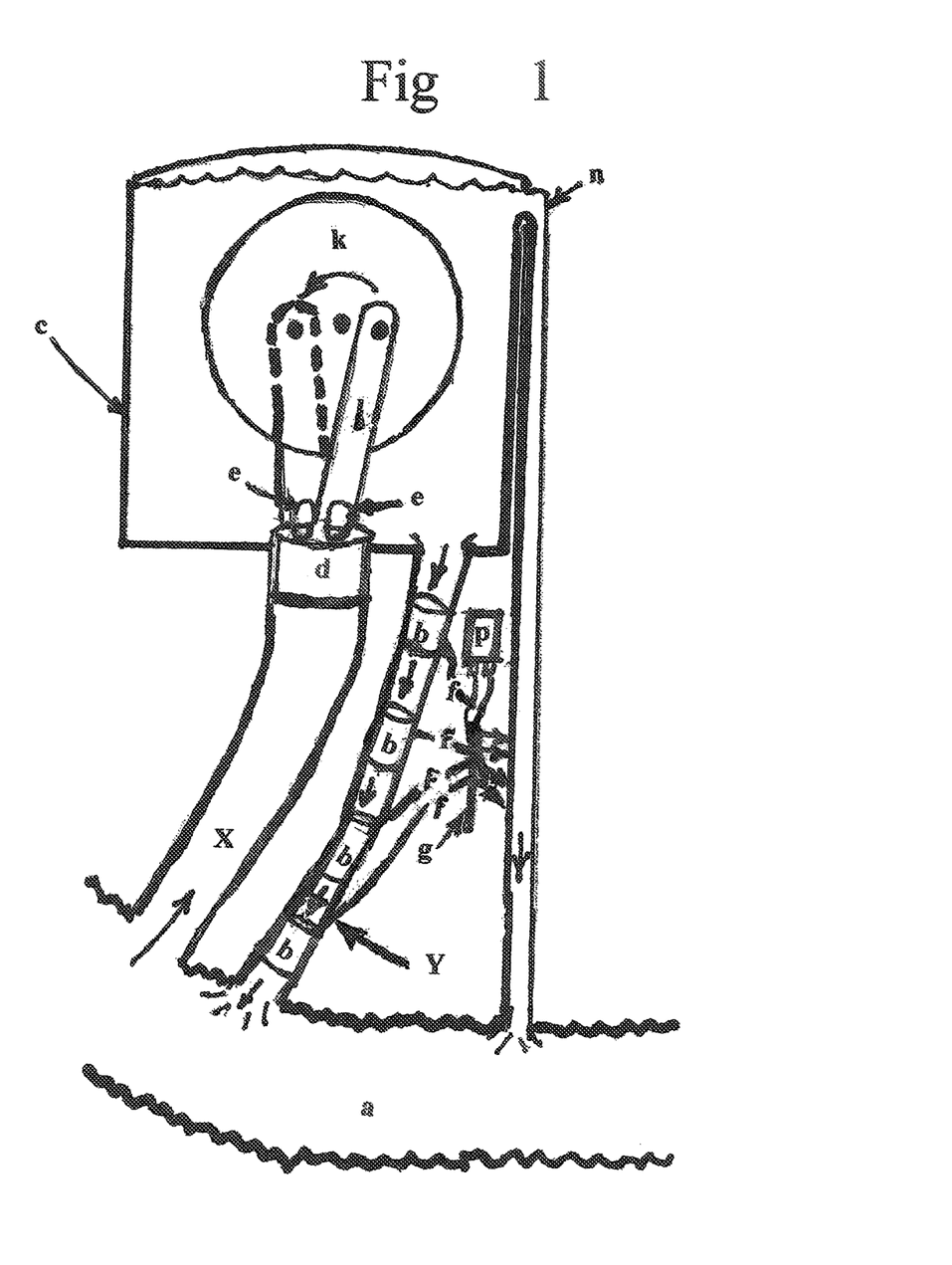
FIG. 1: The Water Pumping and Lifting Apparatus. The Figure looks at the pumping mechanism that pumps and lifts water from a water table or body of water such as a river or lake or reservoir and the power source for such pump is wind power that turns the blades of a windmill and pumps and lifts water to a water holding tank.

FIG. 1: The Water Pumping and Lifting Apparatus. The Figure shows the pumping mechanism that pumps and lifts water from (a) a lower water source such as a water table or lake or river—e.g., the Columbia River—up through pipeline (X) to an elevated (c) water holding tank. Wind power (h) turns the blades of a (i) windmill to push up and pull down (d) a Plunger with (e) flaps that open to let water through the plunger when the plunger is pushed down, and close to stop water from flowing through the plunger when the plunger is pushed up to pump and lift water to (c) a water holding tank such as a water tank or reservoir or lake or pool that is higher than the water that is raised by the plunger.

The key to the alpha numbers in all the Figures is as follows:

(a) The lower water source table or lake or river—e.g., the Columbia River—that is the source of the water that is drawn upwards by the windmill to a (c) water holding tank above the water table or lake or river.

(b) In-pipe hydroelectric generator units to generate electricity from water that flows by gravity down pipe Y for utility customer use.

(c) a water holding tank such as a water tank, or reservoir, or lake, or pool that is higher than the (a) lower water source level so that it is able to receive the water that is pumped by the (i) windmill from the (a) lower water source.

(d) a plunger with flaps that open to let water through the plunger when the plunger is pushed down into a pipeline of water, and close to stop water from flowing through the plunger when the plunger is pushed up to pump and lift water to a (c) water holding tank such as a water tank or reservoir or lake or pool that is higher than the (a) lower water source that is raised by the plunger.

(e) flaps that open to let water through the plunger when the plunger is pushed down, and close to stop water from flowing through the plunger when the plunger is pushed up, to pump and lift water to a (c) water holding tank such as a water tank or reservoir or lake or pool that is higher than the (a) lower water source.

(f) Electricity wires that transfer electricity from the (b) in-pipe hydroelectric generator units to a (g) utility pole of a utility company.

(g) utility pole of a utility company that will receive electricity from (b) in-pipe hydroelectric generator units.

(h) wind that turns the (i) windmill(s).

(i) windmill that pulls and pushes the (d) plunger to pump water from a (a) lower water source up to the (c) water holding tank.

(j) weathervane which rotates on its pole axis as it is blown by the wind so that the (i) windmill is always facing into the wind for the most effective wind force on its blades.

(k) flywheel to rotate the plunger lever up and down to lift and drop the (d) plunger to pump water from the (a) lower water source up to the higher (c) water holding tank.

(l) plunger lever to pump water from the (a) lower water source up to the higher (c) water holding tank.

(m) wire/plastic mesh covering that will allow (h) wind to blow and turn the (i) windmill(s) but will not allow birds or animals to be harmed by the turning blades of the (i) windmill(s).

(n) overflow pipe to take excess water from the top of the (c) water holding tank that would normally overfill the (c) water holding tank and send it directly down to the (a) lower water source. This potential overflow results from the fact that the (X) pipeline takes water from the (a) lower water source to the higher (c) water holding tank and delivers a volume of water to the (c) water holding tank that is larger than the (Y) pipeline that takes water from the higher (c) water holding tank to the (a) lower water source. The excess of the volume of the water being delivered to the (c) water holding tank over the water being taken from the (c) water holding tank is the volume of water that will be taken from the top of the (c) water holding tank by the (n) overflow pipe. The result of delivering a volume of water to the higher (c) water holding tank that is larger than the volume of water that leaves by the (X) pipeline is that the higher (c) water holding tank will always be filled so that there is a steady supply of water to keep the (b) in-pipe hydroelectric generator units in constant operation to supply the utility company with reliable, continuous hydroelectricity. The excess of water in the (c) water holding tank will not explode the (c) water holding tank because it will be released from the top of the (c) water holding tank by the (n) overflow pipe.

(o) arches that support the weight of the (i) windmills and intersect at the top for more structural integrity during earthquakes. The arches are colored the color of tree trunks that are common to the local environment so that they will blend in with the horizon.

(p) back-up battery that will be charged by the electricity created by (b) in-pipe hydroelectric generator units and will pump water from the (a) lower water source up to the higher (c) water holding tank during unusual times when there is not enough wind to turn the turbines of the (b) in-pipe hydroelectric generator units and the water level in the (c) water holding tank is not sufficient to continue the steady flow of water to create the steady flow of electricity, the back-up battery will restore the water level so that the flow of electricity will be continuous.

(q) auxiliary pump which will pump water to the higher (c) water holding tank in the rare times when the level of water in the higher (c) water holding tank is approaching the point where there is not enough water in the higher (c) water holding tank to ensure the continuous flow of water to the (b) in-pipe hydroelectric generator units. This (q) auxiliary pump will activate during unusual times when there is not enough wind to turn the turbines of the windmills to pump water to the (b) in-pipe hydroelectric generator units and the water level in the (c) water holding tank is not sufficient to continue the steady flow of water to create the steady flow of electricity. During those times, the (p) back-up battery, or an auxiliary power source will power the (q) auxiliary pump and restore the water level so that the flow of electricity will be continuous.

(X) pipeline to take water from the (a) lower water source to the higher (e) water holding tank.

(Y) pipeline to let water from the (c) higher water holding tank drop down, by gravity, to the (a) lower water source.

Figure 2:
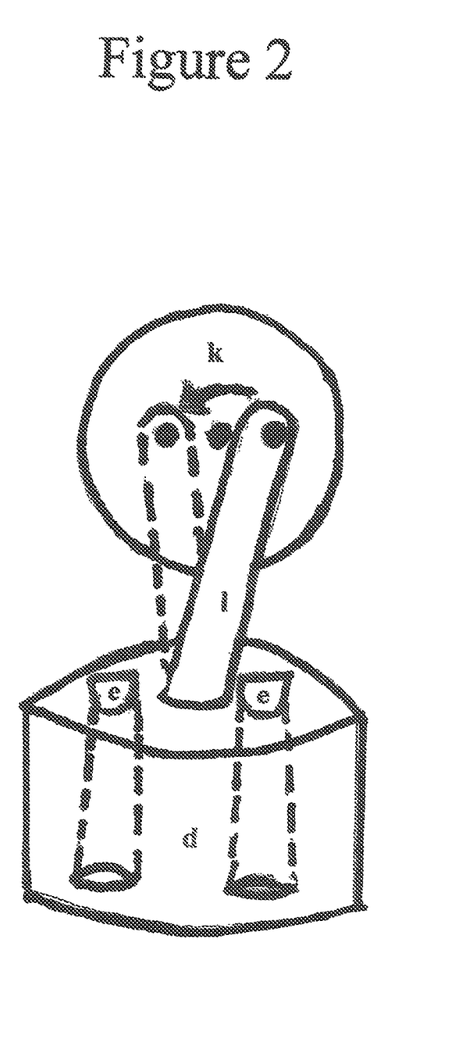
FIG. 2 looks at a water pumping mechanism that has (e) flaps on the top that flap open when the plunger is pushed down into a water surface by the turning of the (k) windmill so that water below the plunger squirts upwards through the open flaps to fill the space above the plunger.

FIG. 2: First View of the Water Pumping and Plunging Apparatus. FIG. 2 looks at a water pumping mechanism that has (e) flaps on the top that flap open when the plunger is pushed down into (a) lower water source surface by the turning of the windmill so that water below the plunger squirts upwards to fill the space above the plunger.

Figure 3:
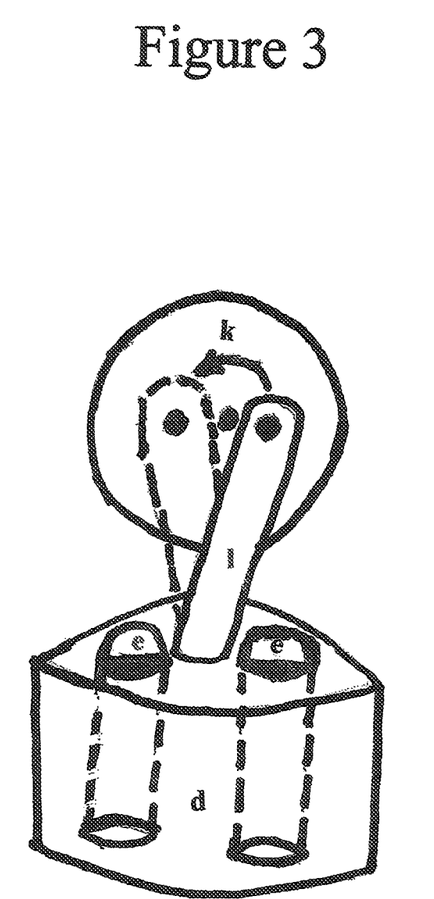
FIG. 3 looks at a water pumping mechanism that has flaps (e) flaps on the top that are closed when the plunger is pushed upward by the turning of the windmill so that water in the pipeline above the plunger is pushed upwards to fill the water holding tank.

FIG. 3: Second View of the Water Pumping and Plunging Apparatus. FIG. 3 looks at a water pumping mechanism that has (e) flaps on the top that flap closed when the plunger is pushed upward by the turning of the windmill so that water in the pipeline above the plunger is pushed upwards to fill the (c) water holding tank.

Figure 4:
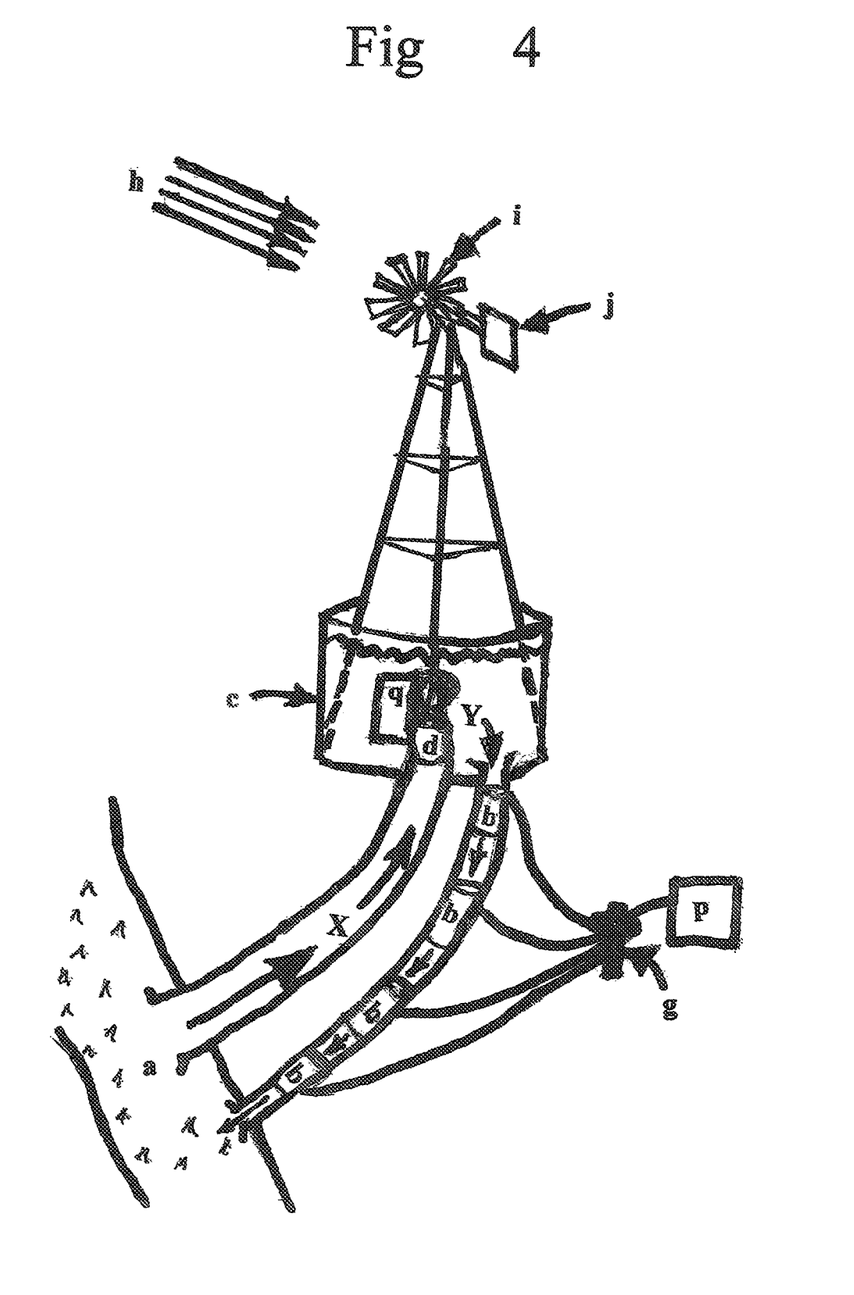
FIG. 4: Old-fashioned Traditional Windmill built on Top of a Platform Structure to Raise Water.

FIG. 4: Old-fashioned Traditional Standing Platform Structure Windmill Embodiment of the In-pipe Pollution-free no-fossil-fuel-using Hydroelectric Generator.

FIG. 4 shows the invention in the form of a single windmill on top of a supporting stick-built platform.

Figure 5:
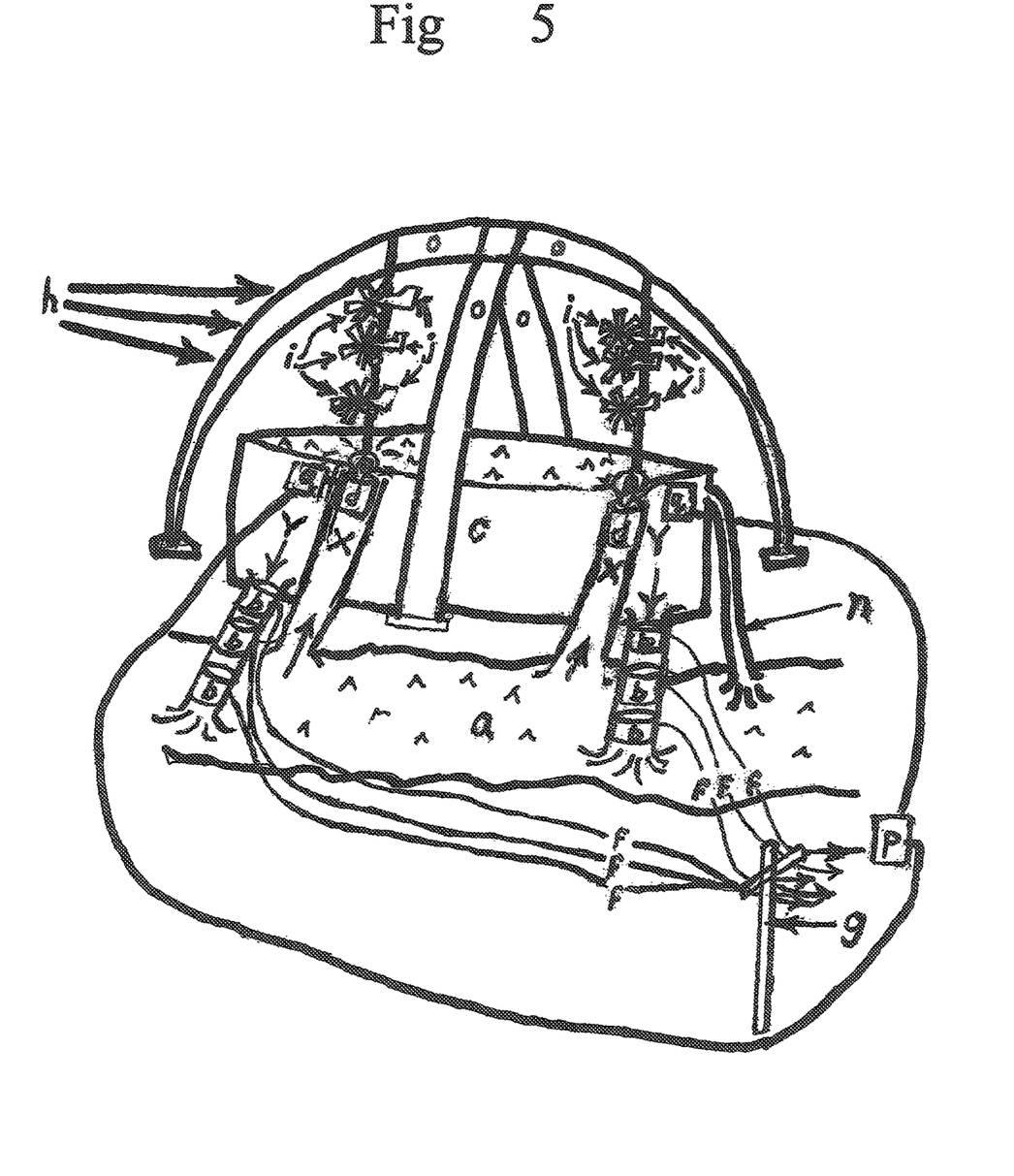
FIG. 5: Multiple Windmills Suspended from Arches for More Powerful In-pipe Pollution-free No-fossil-fuel-using Hydroelectric Generation.

FIG. 5: Multiple Windmills Suspended from (o) Arches for a More Powerful In-pipe Pollution-free No-fossil-fuel-using Hydroelectric Generator without Bird-collision Covers.

As opposed to the FIG. 4 standing platform structure support of the windmill(s), FIG. 5 shows an intersecting arch support structure from which multiple Windmills are suspended, without wire/plastic mesh covers to prevent bird collisions.

Figure 6:
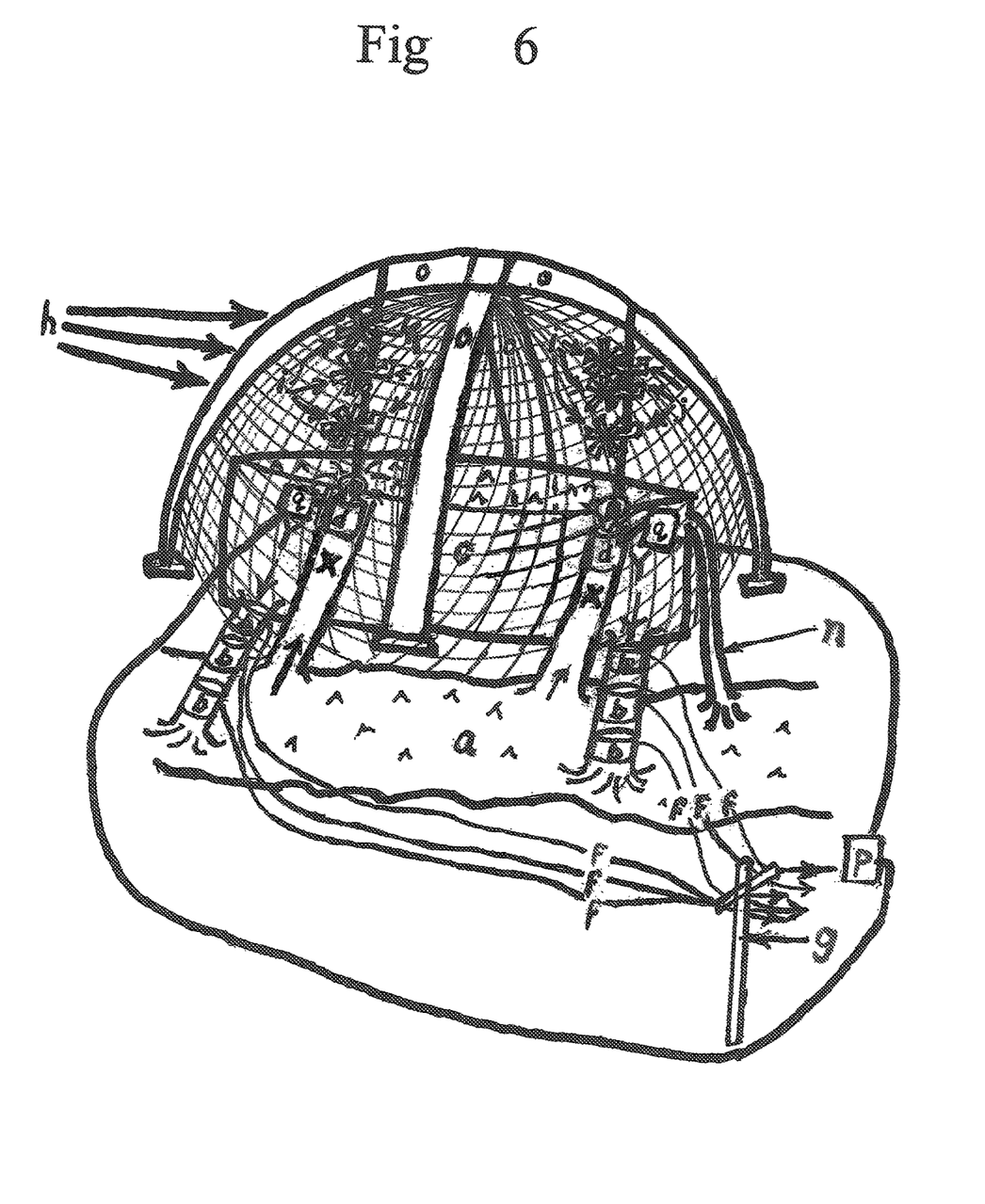
FIG. 6: Multiple Windmills Suspended from Arches with wire mesh cover over all of the windmills.

FIG. 6: Multiple Windmills Suspended from (o) Arches for a More Powerful In-pipe Pollution-free No-fossil-fuel-using Hydroelectric Generator Which are Completely covered by a Colored Wire/Mesh Cover.

As opposed to the FIG. 5 structure, FIG. 6 shows an intersecting arch support structure from which multiple Windmills are suspended and the entire arch support structure is covered with green and black, or brown and black camouflage wire/plastic mesh coverings so that the entire structure has an environmentally-friendly appearance of a forest on a mountain or hill, and so that wind can blow through the wire/plastic mesh to turn the windmills, but birds and animals will be stopped by the wire/plastic mesh so that the birds and animals are not killed by the moving windmill blades.

Figure 7:
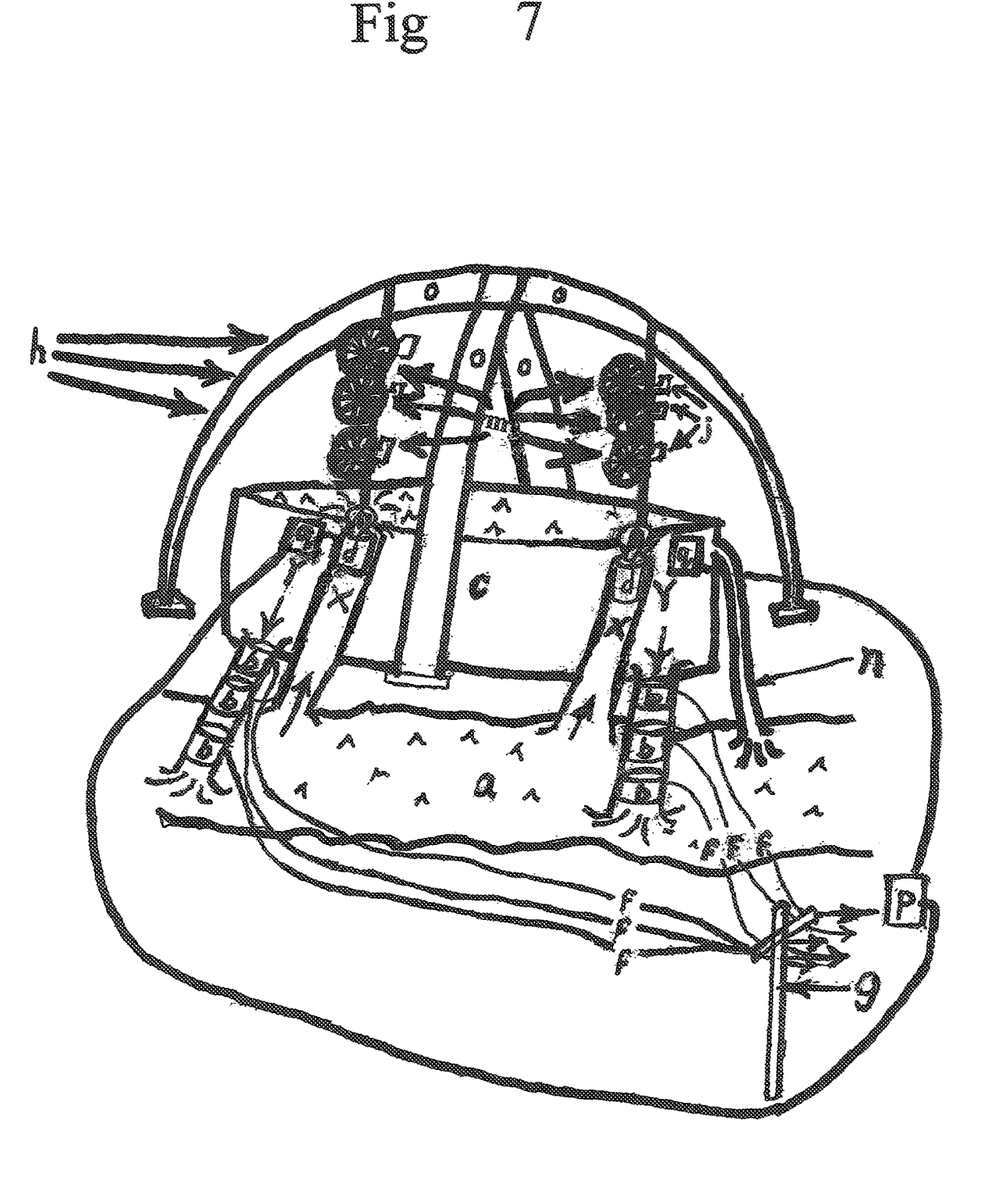
FIG. 7: Multiple Windmills Suspended from (o) Arches for a More Powerful In-pipe Pollution-free No-fossil-fuel-using Hydroelectric Generator with Each Windmill individually covered by a Colored Wire/Mesh Cover. As opposed to the FIG. 6 completely-covered structure.

FIG. 7: Multiple Windmills Suspended from (o) Arches for a More Powerful In-pipe Pollution-free No-fossil-fuel-using Hydroelectric Generator with Each Windmill individually covered by a Colored Wire/Mesh Cover.

As opposed to the FIG. 6 completely-covered structure, FIG. 7 shows an intersecting arch support structure from which multiple Windmills are suspended and each windmill is individually covered by a Colored Wire/Mesh Cover with green and black, or brown and black camouflage wire/plastic mesh coverings so that each windmill has an environmentally-friendly appearance of a forest on a mountain or hill, and so that wind can blow through the wire/plastic mesh to turn the windmills, but birds and animals will be stopped by the wire/plastic mesh so that the birds and animals are not killed by the moving windmill blades.

It should be noted that none of the above figures are drawn to scale and that there can be a wide size and location variation in the various elements of the invention. However, pipeline X will always be larger than pipeline Y so that the (c) water holding tank is in a normal state of being full of water to provide a continuous flow of water to the (b) in-pipe hydroelectric generator units.

David William Stauffer claims the following patent claims:

1. An apparatus for generating electricity comprising:
    an intersecting arch support structure comprising a plurality of arches intersecting and connected at the highest vertical point of each arch of the plurality of arches;
    a plurality of windmill apparatuses suspended downward from at least one arch of said intersecting arch support structure, each windmill apparatus having a plurality of blades; and
    a wire or mesh camouflage structure covering the entire intersecting arch support structure and the plurality of windmill apparatuses suspended therefrom, said camouflage structure camouflages the intersecting arch support structure to blend in with the environment while allowing wind to pass through and keeping birds and animals from being injured by the windmill blades;
    each windmill of the plurality of windmills apparatuses comprising:
        a support structure connecting the windmill to the arch structure, the windmill able to swivel on said support structure; and
        a weathervane passively directing the windmill to swivel on said support structure to face the oncoming wind;
    a hydroelectric apparatus to generate electricity from the water in a water source comprising:
        a higher water storage tank at a vertical height greater than the water source;
        an upward-flowing pipeline leading from the water source to the higher water storage water tank;
        a downward-flowing pipeline leading from the higher water storage tank to the water source;
        an excess water drainpipe connected to the top of the higher water storage tank so that excess water is drained from the tank;
        electricity generators arranged within said downward-flowing pipeline;
        a flywheel mechanically connected to a plurality of plunger levers;
    wherein said windmill apparatuses provide mechanical power to said flywheel, said flywheel providing mechanical power to said plunger levers, wherein said plunger levers pump water from the water source through the upward-flowing pipeline to the higher water storage tank;
    wherein the higher water storage tank stores the water for a gravitationally fed release at a later time through the downward-flowing pipeline, rotating the electricity generators generating electricity for immediate use or storage in a battery connected to the electricity generator;
    wherein said downward-flowing pipeline is larger than said upward-flowing pipeline so that the usual state of the higher water storage tank is full of water.

2. The apparatus for generating electricity of claim 1, further comprising:
    an auxiliary pump arranged to pump water in the upward-flowing pipeline;
    wherein the auxiliary pump is electrically connected to the battery for pumping water from the water source through the upward-flowing pipeline at times when wind energy is not sufficient to pump the water and there is sufficient electrical energy stored in the battery to allow for the water to be pumped to the higher water storage tank; and
    wherein the auxiliary pump is electrically connected to a power supply grid to supply electricity for pumping water from the water source through the upward-flowing pipeline at times when wind energy is not sufficient to pump the water and there is not sufficient electrical energy stored in the battery to allow for the water to be pumped to the higher water storage tank.

3. The apparatus for generating electricity of claim 1, wherein:
    the water source comprises a water table, river, reservoir, or lake.

* * * * *